United States Patent
Diaz, III et al.

(10) Patent No.: US 11,345,380 B1
(45) Date of Patent: May 31, 2022

(54) JANITORIAL CADDY

(71) Applicant: Lil Clean Caddy LLC, Surprise, AZ (US)

(72) Inventors: Santos M. Diaz, III, Surprise, AZ (US); Walter Balfour, Chandler, AZ (US)

(73) Assignee: Lil Clean Caddy LLC, Surprise, AZ (US)

( * ) Notice: Subject to any disclaimer, the term of this patent is extended or adjusted under 35 U.S.C. 154(b) by 24 days.

(21) Appl. No.: 16/857,618

(22) Filed: Apr. 24, 2020

Related U.S. Application Data

(60) Provisional application No. 62/838,136, filed on Apr. 24, 2019.

(51) Int. Cl.

| | |
|---|---|
| *B62B 1/12* | (2006.01) |
| *A47L 25/00* | (2006.01) |
| *B08B 13/00* | (2006.01) |
| *B62B 1/26* | (2006.01) |
| *B62B 5/06* | (2006.01) |
| *B62B 3/10* | (2006.01) |

(52) U.S. Cl.
CPC ............... *B62B 1/12* (2013.01); *A47L 25/00* (2013.01); *B08B 13/00* (2013.01); *B62B 1/26* (2013.01); *B62B 5/065* (2013.01); *B62B 3/104* (2013.01); *B62B 2202/50* (2013.01)

(58) Field of Classification Search
CPC .. B62B 1/12; B62B 1/26; B62B 3/104; B62B 5/065; B62B 2202/50; B08B 13/00; A47L 25/00
See application file for complete search history.

(56) References Cited

U.S. PATENT DOCUMENTS

| | | | |
|---|---|---|---|
| 3,020,972 A | 2/1962 | Hockett | |
| 3,709,513 A | 1/1973 | Cassimally | |
| 3,874,531 A * | 4/1975 | Mayo | B62B 3/10 |
| | | | 414/680 |
| 5,380,033 A | 1/1995 | Harling | |
| 5,575,362 A | 11/1996 | Franklin et al. | |

(Continued)

FOREIGN PATENT DOCUMENTS

JP 3162474 U 9/2010

OTHER PUBLICATIONS

Rubbermaid, Quick Cart—Rubbermaid Executive Series, retrieved from Internet: https://images.salsify.com/image/upload/s--hmBdRmKe--/byzbq0u0m83rxc3mv27k.pdf [retrieved Jan. 3, 2019], 2018, 5 pages.

*Primary Examiner* — James A Shriver, II
*Assistant Examiner* — Ian Bryce Shelton
(74) *Attorney, Agent, or Firm* — Adam R. Stephenson, Ltd

(57) ABSTRACT

Implementations of janitorial caddies may include a body including a lid, a base opposing the lid, and a first side coupled between the lid and the base. The implementations may also include two wheels coupled to the base, a telescoping handle coupled within the first side, a first shelf extending from a second side of the body and a second shelf extending from a third side of the body. The third side may be opposite the second side. The implementations may also include a first removable caddy coupled over the first shelf and a second removable caddy coupled over the second shelf. The body may be configured to be stood on by a person when the lid is in a closed configuration.

20 Claims, 9 Drawing Sheets

(56) References Cited

U.S. PATENT DOCUMENTS

| | | | |
|---|---|---|---|
| 5,887,878 A * | 3/1999 | Tisbo | B62B 1/20 |
| | | | 280/47.19 |
| 5,893,572 A | 4/1999 | Parks | |
| 6,497,423 B1 | 12/2002 | Perelli et al. | |
| 6,761,366 B1 | 7/2004 | Klemmensen et al. | |
| 6,827,357 B2 | 12/2004 | Calmeise et al. | |
| 7,338,054 B2 | 3/2008 | Pint | |
| 8,696,028 B2 * | 4/2014 | Nelson | A47L 13/50 |
| | | | 280/830 |
| 10,086,508 B2 * | 10/2018 | Hoppe | A45C 13/36 |
| 10,137,916 B1 * | 11/2018 | Glassberg | B62B 3/02 |
| 10,610,073 B1 * | 4/2020 | Lucas | A47L 9/2873 |
| 2004/0227315 A1 * | 11/2004 | Van Landingham, Jr. | |
| | | | B62B 5/06 |
| | | | 280/47.35 |
| 2006/0232033 A1 * | 10/2006 | Pint | B62B 5/02 |
| | | | 280/79.2 |
| 2008/0136130 A1 | 6/2008 | Washington | |
| 2010/0052293 A1 | 3/2010 | Brooks et al. | |
| 2010/0066045 A1 * | 3/2010 | Presnell | B62B 3/10 |
| | | | 280/47.18 |
| 2011/0133417 A1 * | 6/2011 | Rouillard | A47L 13/51 |
| | | | 280/35 |
| 2012/0228841 A1 * | 9/2012 | Kinskey | B25H 3/022 |
| | | | 280/47.17 |
| 2015/0091265 A1 | 4/2015 | Bentson | |
| 2015/0097348 A1 * | 4/2015 | Steinfels | F16M 11/2092 |
| | | | 280/47.35 |
| 2015/0210306 A1 * | 7/2015 | Oachs | B25H 5/00 |
| | | | 280/79.11 |
| 2017/0158216 A1 * | 6/2017 | Yahav | B62B 1/16 |
| 2017/0327141 A1 * | 11/2017 | Thuma | B62B 3/10 |
| 2019/0111956 A1 * | 4/2019 | Phillips | B62B 3/10 |

\* cited by examiner

JANITORIAL CADDY

CROSS REFERENCE TO RELATED APPLICATIONS

This document claims the benefit of the filing date of U.S. Provisional Patent Application 62/838,136, entitled "Janitorial Caddy" to Diaz which was filed on Apr. 24, 2019, the disclosure of which is hereby incorporated entirely herein by reference.

BACKGROUND

1. Technical Field

Aspects of this document relate generally to caddies. More specific implementations involve janitorial caddies.

2. Background

Caddies are storage containers which may be used to hold and/or organize supplies or tools. Caddies may be transportable and may include one or more compartments. Caddies may be handheld. Examples of caddies include caddies for tools, craft supplies, or fishing supplies.

SUMMARY

Implementations of janitorial caddies may include a body including a lid, a base opposing the lid, and a first side coupled between the lid and the base. The implementations may also include two wheels coupled to the base, a telescoping handle coupled either within the first side or flush against the first side, a first shelf extending from a second side of the body and a second shelf extending from a third side of the body. The third side may be opposite the second side. The implementations may also include a first removable caddy coupled over the first shelf and a second removable caddy coupled over the second shelf. The body may be configured to be stood on by a person when the lid is in a closed configuration.

Implementations of janitorial caddies may include one, all, or any of the following:

The janitorial caddy may be configured to be used as a step stool.

The second side, third side, and a fourth side of the body opposite the first side may be substantially open.

Implementations of the janitorial caddy may also include a crossbar extending across the fourth side.

The first shelf may include a first recess configured to receive the first removable caddy and the second shelf may include a second recess configured to receive the second removable caddy.

The first side may include a first channel corresponding with a second channel within a length of the telescoping handle.

An angle formed between the lid and a fourth side opposite the first side may be obtuse.

Implementations of janitorial caddies may include a body including a lid, a base opposing the lid, and a first side coupled between the lid and the base. The implementations may also include two wheels coupled to the base and a telescoping handle coupled either within the first side or flush against the first side. The telescoping handle may include a first portion and a second portion. The implementations may also include a first shelf extending from a second side of the body and a second shelf extending from a third side of the body. The third side may be opposite the second side. The implementations may also include a first removable caddy coupled over the first shelf and a second removable caddy coupled over the second shelf. The janitorial caddy may be configured to be used as a step stool. The first portion of the telescoping handle may be configured to be received by the second portion of the telescoping handle. The first portion of the telescoping handle may include a first channel extending along a longest length of the first portion. The second portion may include a second channel extending along a longest length of the second portion. The first portion may include a plurality of notches formed therein at an end of the first portion.

Implementations of janitorial caddies may include one, all, or any of the following:

The second portion may be extendable from the first side of the body.

One of substantially half or more than half of the second portion may remain either in the first side or flush against the first side when the telescoping handle is in a fully extended configuration.

The first side may include a third channel corresponding to the second channel and the first channel.

A width of the first channel may be greater than a width of the second channel and the width of the second channel may be greater than a width of the third channel.

A width of the second portion perpendicular to a longest length of the telescoping handle may be greater than any width of the first portion perpendicular to the longest length of the telescoping handle.

The implementations of janitorial caddies may include a first clasp configured to fasten a handle of the first removable caddy to the body and a second clasp configured to fasten a handle of the second removable caddy to the body.

Implementations of janitorial caddies may include a body including a lid, a base opposing the lid, and a first side coupled between the lid and the base. The implementations may also include two wheels coupled to the base, a telescoping handle coupled within the first side, and a compartment fixed to an outer surface of the first side of the body. The compartment may include a slit in a sidewall thereof. The implementations may also include a first shelf extending from a second side of the body and a second shelf extending from a third side of the body. The third side may be opposite the second side. The implementations may also include a first removable caddy coupled over the first shelf, a second removable caddy coupled over the second shelf, and a third shelf retractably coupled within the base of the body. The body may be configured to be stood on by a person when the lid is in a closed configuration.

Implementations of janitorial caddies may include one, all, or any of the following:

The compartment fixed to the outer surface of the first side of the body may include one or more dividers forming additional compartments. The additional compartments may each include an additional slit in a sidewall in each of the additional compartments.

Implementations of the janitorial caddy may include a compartment hanging from an upper portion of the body. The compartment may be included within the body.

An interior of the body may be accessible through the second side, the third side, and a fourth side opposite the first side of the body.

Implementations of the janitorial caddy may include a first clasp configured to fasten a handle of the first removable caddy to the body and a second clasp configured to fasten a handle of the second removable caddy to the body.

The first shelf may include a first recess configured to receive the first removable caddy and the second shelf may include a second recess configured to receive the second removable caddy.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended janitorial caddy will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such janitorial caddies, and implementing components and methods, consistent with the intended operation and methods.

Though the caddies disclosed herein are primarily referred to as janitorial caddies, it is understood that the implementations of the caddies disclosed herein, including various components and subcomponents of the caddies, may be used in other caddies that are not janitorial caddies in various applications, including, by non-limiting example, manufacturing, household use, agricultural applications, and other activities involving use of many different components in various related tasks. Further, it is understood that the definition of caddies, as used herein, include carts.

Figure 1:
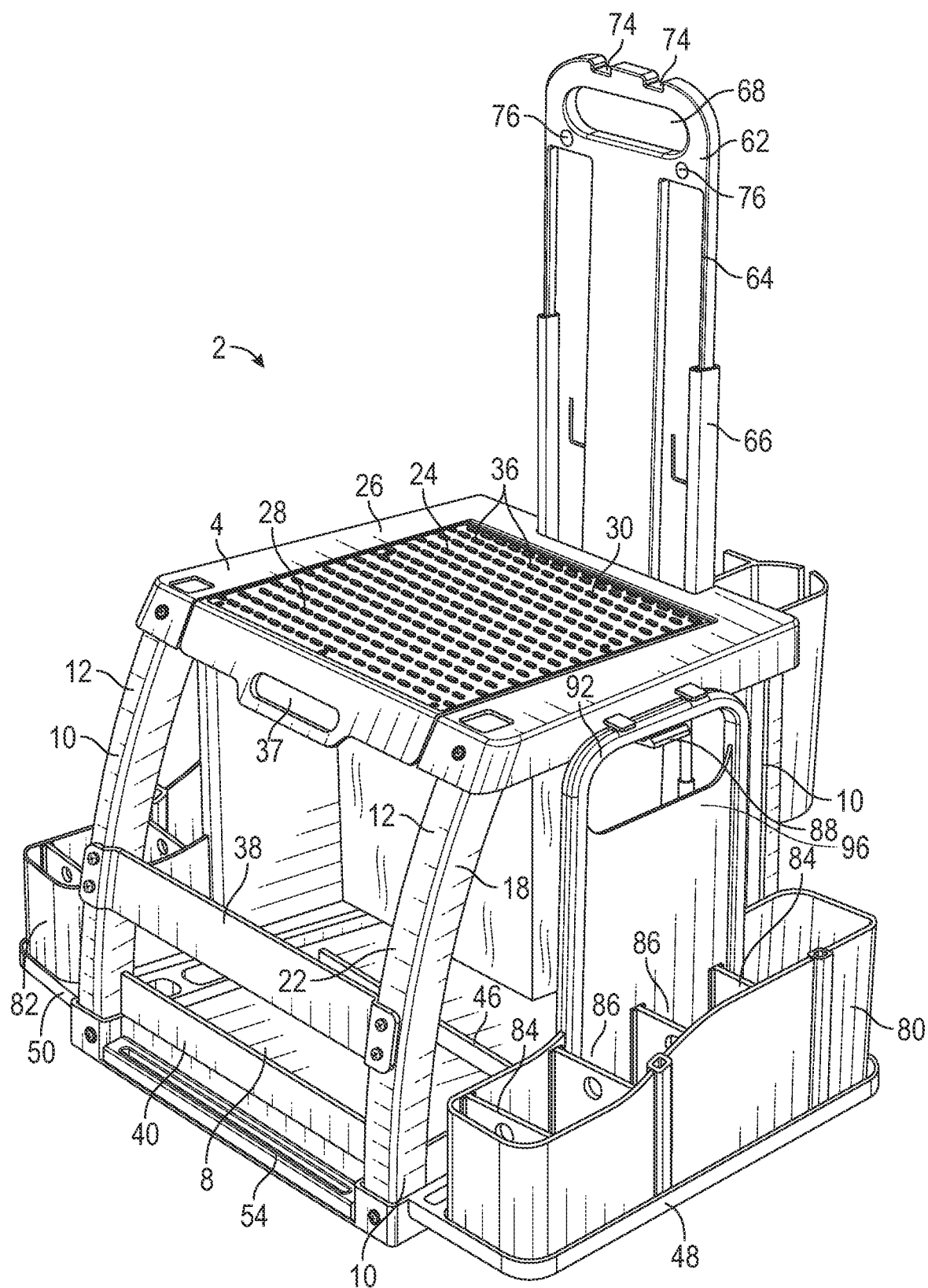
FIG. 1 is a front, left perspective view of a janitorial caddy.
Figure 2:
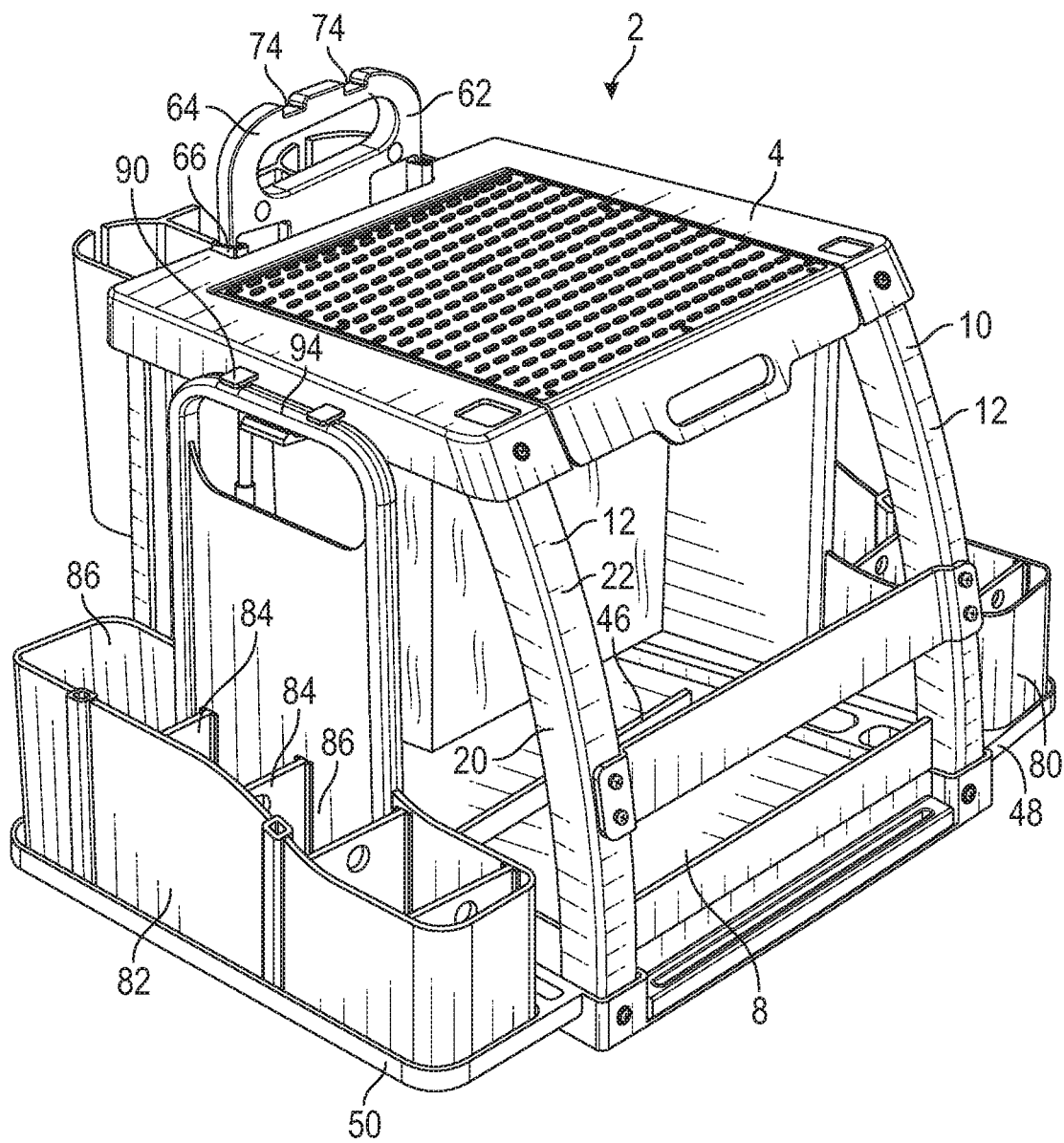
FIG. 2 is a front, right perspective view of the janitorial caddy having the handle collapsed.
Figure 3:
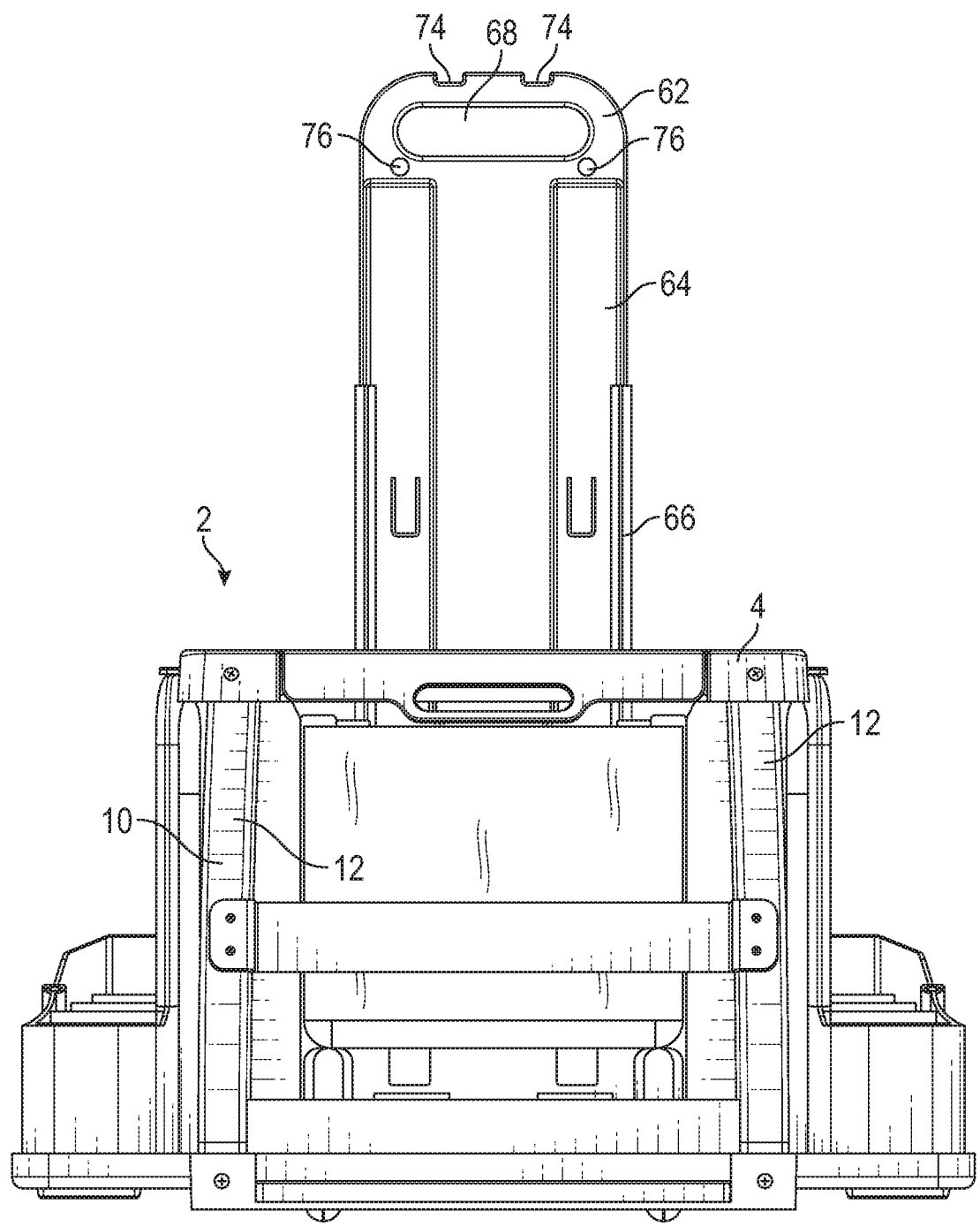
FIG. 3 is a front view of the janitorial caddy.
Figure 4:
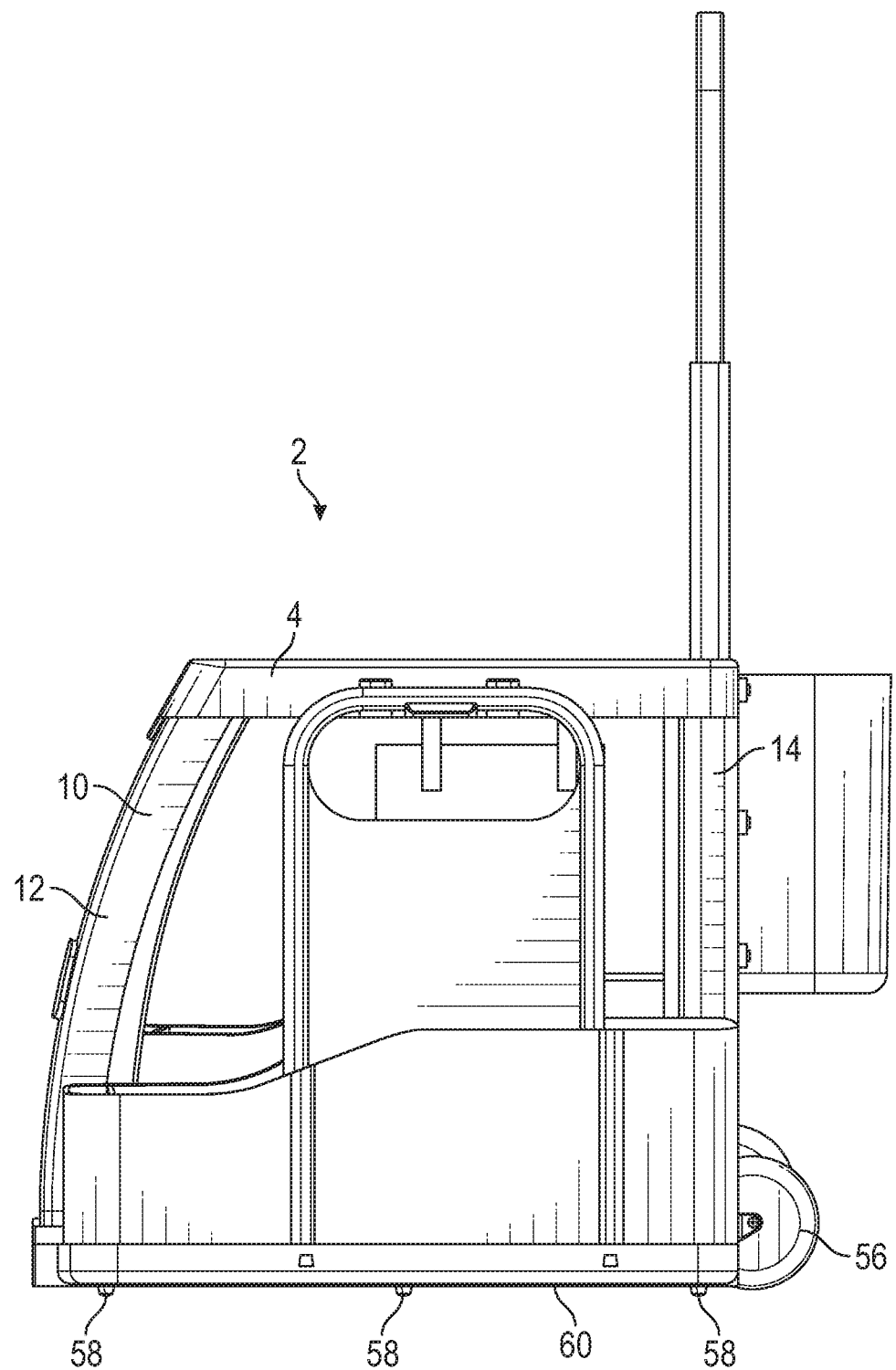
FIG. 4 is a side view of the janitorial caddy.
Figure 5:
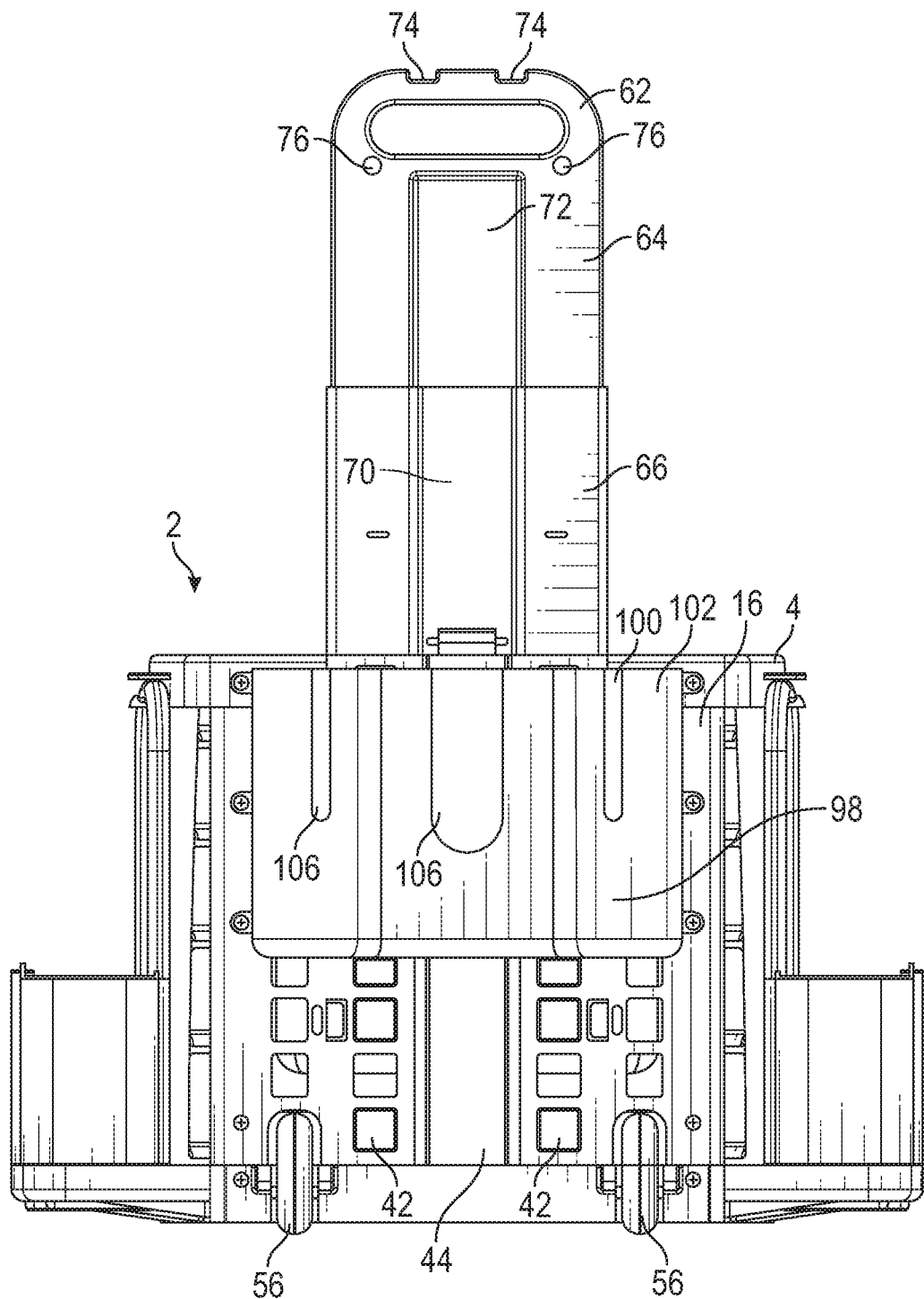
FIG. 5 is a rear view of the janitorial caddy.
Figure 6:
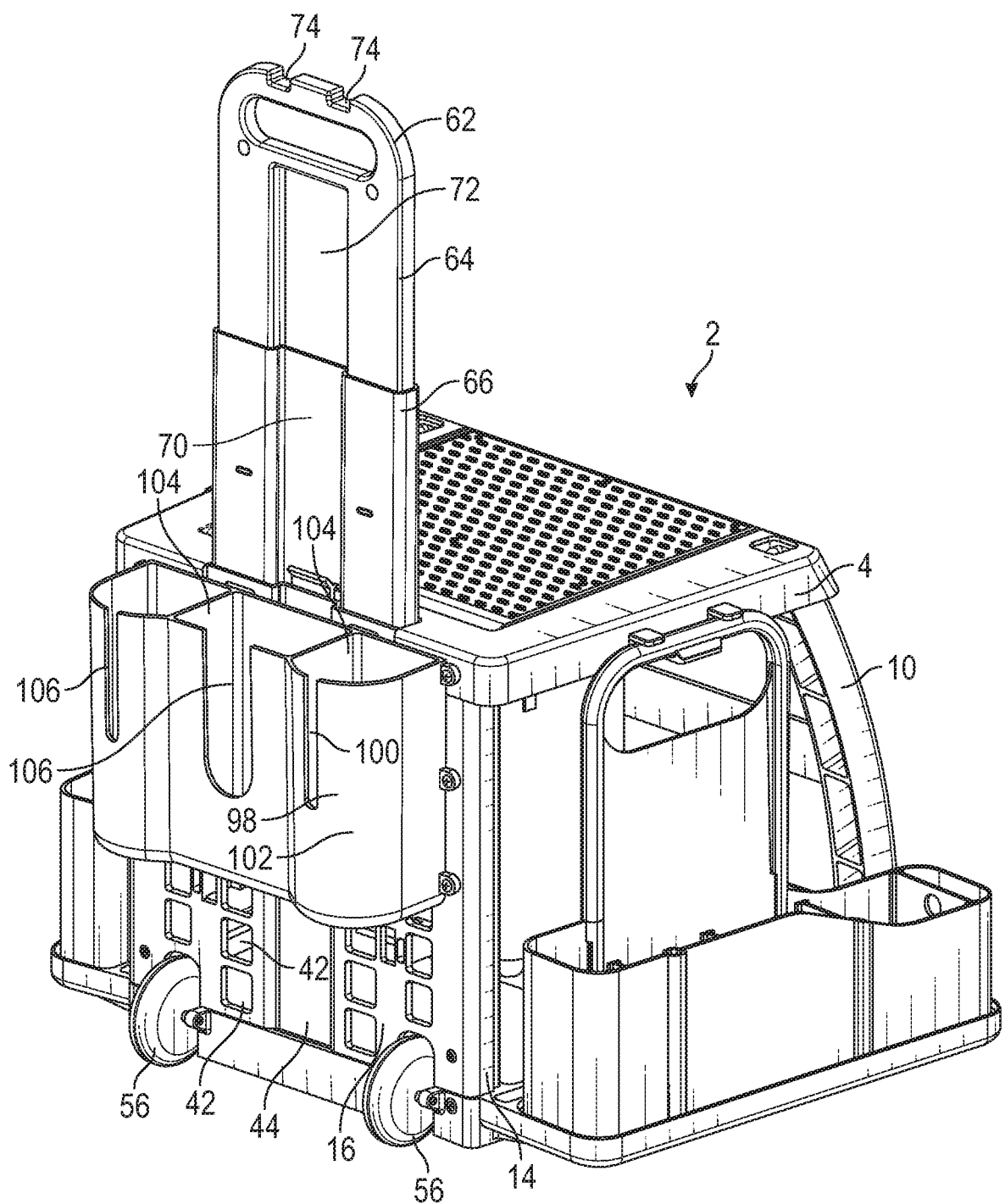
FIG. 6 is a rear perspective view of the janitorial caddy.
Figure 7:
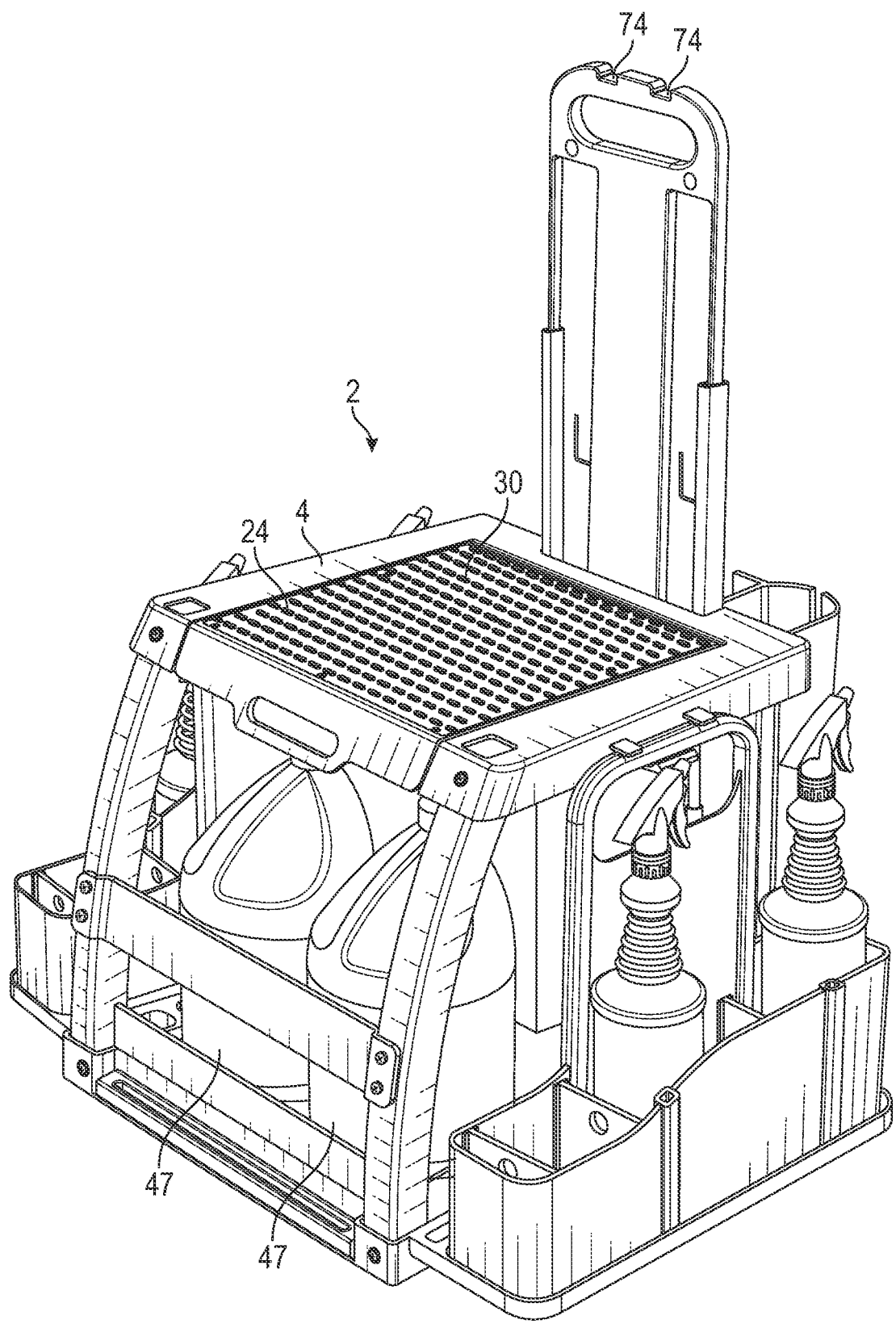
FIG. 7 is a front perspective view of the janitorial caddy having cleaning supplies therein.
Figure 8:
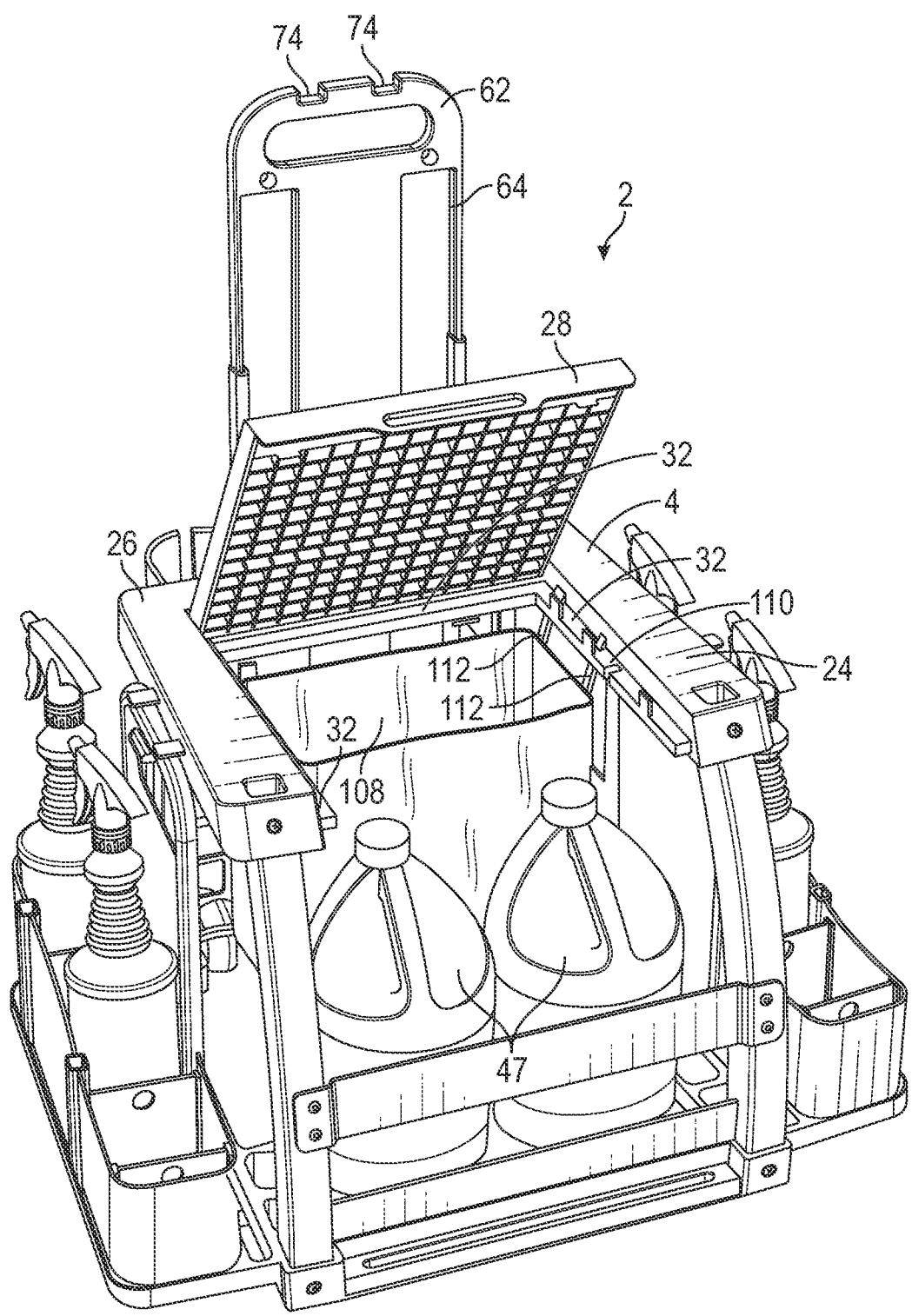
FIG. 8 is a front perspective view of the janitorial caddy having the lid in an open configuration.
Figure 9:
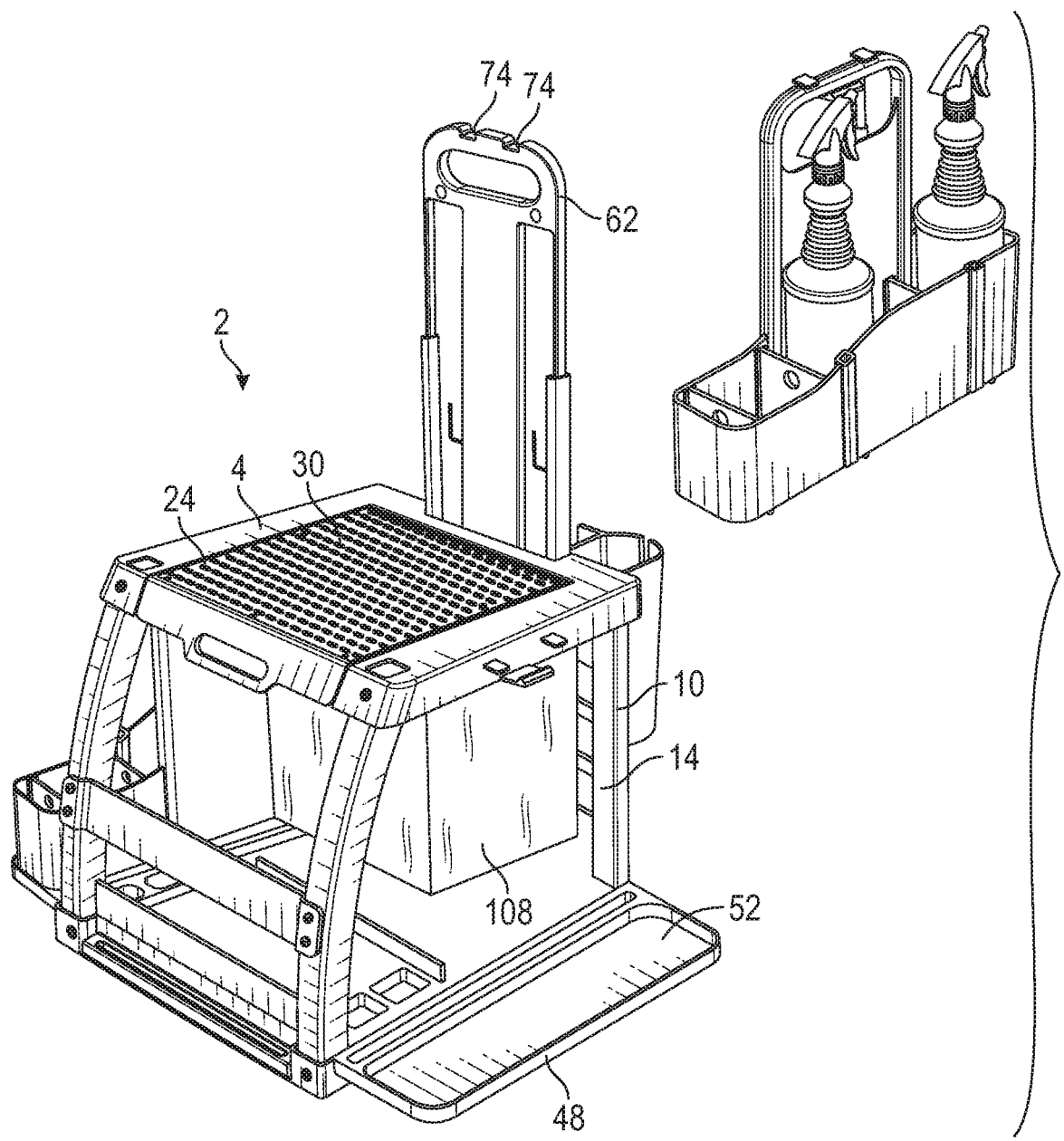
FIG. 9 is a front perspective view of the janitorial caddy having a removable caddy removed from the janitorial caddy.

Referring to FIGS. 1-9, various views of a janitorial caddy are illustrated. Referring specifically to FIG. 1, a front, left perspective view of a janitorial caddy is illustrated. As illustrated, the caddy 2 includes a body 4. In various implementations, the body 4 may include multiple pieces removably coupled together. In other implementations, the body 4 may include pieces fixed together, as is illustrated by FIGS. 1-9. In still other implementations, the body 4 may be a single unitary piece and may be produced from a single mold. In various implementations, the body 4 may be made from, by non-limiting example, a polymer based material, metal, or any other material. In various implementations, the outer shape of the body 4 may have the shape of substantially a cube, while in other implementations it may include any other shape. In various implementations, the body 4 may be two feet wide and two feet long, however, in other implementations the body may be more or less than two feet wide and/or more or less than two feet long. As illustrated by FIG. 1, the body includes a lid 24, a base 8 opposing the lid, and a frame 10. In various implementations, the frame 10 may include four support, each support extending between each corner of the lid 24 and a corresponding corner of the base 8. Referring to FIG. 2, a front, right perspective view of the janitorial caddy having the handle collapsed is illustrated, referring to FIG. 3, a front view of the janitorial caddy is illustrated, and referring to FIG. 4, a side view of the janitorial caddy is illustrated. As illustrated by FIGS. 1-4, the two front supports 12 of the frame are illustrated. Referring to FIG. 6, a rear perspective view of the janitorial caddy is illustrated, and referring to FIG. 9, a front perspective view of the janitorial caddy having a removable caddy removed is illustrated. As illustrated by FIGS. 4, 6 and 9, the rear supports 14 of the frame 10 are illustrated.

Referring to FIG. 5, a rear view of the janitorial caddy is illustrated. The body 4 includes a first side 16 coupled between the lid 24 and the base 8. Referring to the orientation of the caddy as illustrated by FIG. 1, the first side 16 is the rear side of the body 4. The body 4 also includes a second side 18, a third side 20 opposite the second side (as illustrated by FIG. 2), and a fourth side 22 opposite the first side 16.

Still referring to FIG. 1, the body 4 may include a lid 24. In various implementations, the lid 24 may include a fixed portion 26 coupled over the first side, second side 18, and the third side of the body. In such implementations, the lid 24 may also include a hinged portion 28 configured to open and close, providing access to the interior of the body. Referring to FIG. 8, a front perspective view of the janitorial caddy having the lid in an open configuration is illustrated. As illustrated by FIG. 8, the lid 24 may be hinged and may be configured to close over the interior of the body 4, as illustrated by FIG. 7, which illustrates a front perspective view of the janitorial caddy having cleaning supplies therein. In other implementations, the lid 24 is not hinged but may slide into a closed position or may be removably coupled from the rest of the caddy.

In various implementations, the body 4 is configured to be stood on by a person when the lid 24 is in a closed configuration. In such implementations, the janitorial caddy 2 is configured to also be used as a foot stool. In implementations where the janitorial caddy also serves as a foot stool, the caddy may be particularly helpful to an individual cleaning areas just out of reach. In various implementations, the lid 24 may include a non-slip surface which may be coupled to or formed as part of the top surface 30 of the lid (as illustrated by FIGS. 1 and 7). Referring back to FIG. 8, in various implementations, the fixed portion 26 of the lid may include a lip 32 which is configured to support the hinged portion 28 of the lid when the lid is in a closed configuration. In various implementations, the lid, and the janitorial caddy used as a step stool, may be able to support 250 or more pounds.

Referring back to FIG. 1, in various implementations the lid 24 may include a plurality of openings 36 therethrough. In such implementations, the openings 36 may reduce the weight of the janitorial caddy 2 and may also contribute non-slip properties to the lid 24. In various implementations, the lid 24 may include a handle 37 therein used to facilitate opening and closing of the lid. In various implementations, the lid 24 may include a lock and may be configured to releasably lock in a closed or open configuration.

Referring back to FIGS. 1-2 and 9, the second side 18 of the body 4, the third side 20 of the body 4, or both the second and the third side may be opened except for the supports of the frame 10, thus allowing access to the interior of the body through the second and/or third side. In other implementations, the second side, the third side, or both the second and third side may be closed, substantially closed, closable, and/or include one or more crossbars or other supports. In implementations where the second and/or third side is not open as illustrated by FIGS. 1-2 and 9, the material forming the second and/or third side may include any material disclosed herein.

Still referring to FIG. 1, the fourth side 22 of the body 4 may be substantially open, thus allowing access to the interior of the body through the fourth side. As illustrated by FIG. 1, in various implementations the body 4 may include a crossbar 38 extending across the fourth side 22 and coupling the two front supports 12 together. In such implementations, the crossbar 38 may strengthen the structure of the janitorial caddy 2 and may also serve as a barrier to prevent unintentional departure of items stored within the interior of the body 4.

In various implementations the fourth side 22 may also include a lip 40 at the base thereof. In such implementations, the lip 40 may also strengthen the structure of the janitorial caddy 2 and may also serve as a barrier to prevent unintentional departure of items stored within the interior of the body 4. In other implementations, the fourth side may be entirely closed, substantially closed, and/or closable.

As illustrated by FIG. 1, in various implementations the angle formed between the lid 24 and the fourth side 22 is obtuse. In other implementations, the angle formed between the lid 24 and the fourth side 22 may be a right angle or acute. In implementations having an obtuse angle, the interior of the body may include more volume than if the angle were a right angle or acute. In various implementations surface of the fourth side 22 may be curved, while in other implementations it may be straight.

Referring to FIGS. 5-6, the first side 16 of the body 4 may be substantially closed. In such implementations, the substantially closed structure of the first side 16 may prevent materials from unintentionally departing the interior of the body 4 (which may occur during transit of the caddy when the base of the caddy slopes downwards towards the first side). As illustrated by FIGS. 5-6, the first side 16 may include a plurality of openings 42 therein, though in other implementations the fourth side may be entirely closed.

As illustrated by FIGS. 5-6, the first side 16 may include a channel 44. The channel 44 may correspond to the channels within the length of the handle, meaning that the channel 44 may either be configured to receive or be received by the channels in the handle, thus allowing the handle to telescope within the first side 16 of the body 4. In such implementations, the channel 44 may strengthen the structure of the first side 16 of the body 4.

Referring back to FIGS. 1-2, the body 4 includes a base 8. In various implementations, the base 8 may be configured to receive the front supports 12 and the back supports 14. The base may include any material disclosed herein. In various implementations, and as illustrated by FIGS. 1-2, the base may include one or more dividers 46. The dividers may divide the interior of the body 4 into different compartments. In implementations having dividers forming different compartments, the compartments may be any size and any shape, and may vary in size and shape from one another or may all be the same size and shape. In various implementations, the compartments may be a fixed shape and size, however, in other implementations the body 4 may include a single compartment therein which may be customized by dividing the single compartment into a plurality of sub-compartments. In such implementations, the base and/or inner sides of the first, second, third, and fourth sides may include notches, ridges, or other coupling mechanisms therein configured to couple to a corresponding divider. In various implementations, the dividers may also include notches, ridges, and/or other coupling mechanisms configured to further allow the sub-compartments to be further divided. The dividers may also contribute structural support to the caddy. In various implementations, the dividers may be removable, thus allowing the shape and size of the sub-compartments to be changed and customized. In various implementations the heights of the one or more dividers 46 may vary, creating either shallow or deep compartments. In various implementations, and as illustrated by FIGS. 7-8, the compartments may be configured to hold cleaning supplies, such as, by non-limiting example, towels, spray bottles, chemicals, soap, scrubbers, dusters, garbage receptacle liners/bags, and any other janitorial supply and/or equipment. In particular implementations, and as illustrated by FIGS. 7-8, the compartments may be configured to hold bottles 47 of janitorial supplies. In various implementations, the caddy may include one or more drawers accessible through any side of the caddy. In such implementations, the drawers may be located near the base of the caddy and may be below compartments accessible through the top of the caddy.

In other implementations, the base 8 may not include any dividers. In such implementations the interior of the body may form a single, undivided volume.

In various implementations, the body 4 may include one or more handles which may allow for the caddy 2 to be lifted. The handles may be coupled to the body 4 or may be formed within the body.

Referring back to FIGS. 1-2, in various implementations the janitorial caddy 2 may include a first shelf 48 extending from the second side 18 of the body 4 and/or a second shelf 50 extending from the third side 20 of the body 4. In various implementations, the first shelf 48 and/or the second shelf 50 may be formed as a single unit with the remainder of the base. In other implementations, the first shelf 48 and/or the second shelf 50 may not be considered as part of the base but may still be coupled to the second side 18 and the third side 20 of the body. As illustrated by FIG. 9, the first shelf 48 may include a recess 52 configured to receive the first removable caddy. In various implementations, the second shelf may include a similar recess and may be configured to receive the second removable caddy. In other implementations the first and/or second shelf may not be configured to receive a removable caddy but may be configured to directly hold janitorial supplies.

Referring back to FIG. 1, in various implementations the janitorial caddy may include a third shelf 54 retractably coupled within the base 8 of the body 4 of the caddy 2. In other implementations the third shelf 54 may not be retractable but may extend from the fourth side of the body. In implementations where the third shelf 54 is retractable, it may be retracted into a base 8 of the body 4 of the caddy 2 or may be retracted to a position just below the base of the body of the caddy. In other implementations, the third shelf 54 may be hinged and configured to fold up against the fourth side 22 of the body 4 of the caddy 2. In various implementations the caddy 2 may include a support, which may be a strap or chain, between the body 4 of the caddy 2 and the third shelf 54 configured to prevent the third shelf 54 from collapsing or contacting the ground. In various implementations, the third shelf 54 may be configured to hold, among other things, a garbage receptacle, a laundry receptacle, a vacuum, a mop bucket, or any other janitorial supply or piece of equipment. The third shelf 54 may include one or more wheels/rollers coupled to the bottom of the third shelf. In various implementations, a restraining strap may be coupled to the body 4 of the caddy 2. The restraining strap may be configured to extend around the respective janitorial supply or piece of equipment (such as a vacuum) and latch (or otherwise couple) to the body 4 in a manner that holds the janitorial supply or piece of equipment in place. In various implementations, the third shelf 54 may extend from the body 4 in a position parallel to the ground. In other implementations, the third shelf 54 may be angled towards the body 4 in order to better prevent items from falling off the platform by holding them against the body 4.

Referring to FIGS. 4-6, in various implementations the caddy may include two or more wheels 56 coupled to the base 8 to allow enhanced mobility of the caddy. As illustrated by FIGS. 4-6, two wheels are included near the first side 16 of the body 4 of the caddy 2. In various implementations, the caddy 2 may be moved by tilting the caddy 2 onto the wheels 56 and pulling or pushing the caddy using a handle similar to the handles described herein. In various implementations, as illustrated by FIG. 4, the caddy may include feet 58 near the fourth side of the caddy. In various implementations, the caddy may also include feet 58 disposed elsewhere along the bottom 60 of the base 8. The feet 58 may include slide-resistant material to decrease the ability of the caddy to slide when the feet 58 are in contact with the ground. The feet 58 may also level the caddy 2 in implementations where the wheels 56 extend below the base 8 of the body 4 of the caddy 2. By leveling the caddy 2 and securing it to the floor through a non-slip surface, the safety of the caddy when used as a footstool may be increased.

In other implementations, the caddy 2 may include four wheels/rollers instead of two. In such implementations, at least two of the wheels, and in other implementations, all four of the wheels, may be configured to swivel. The swiveling wheels may be configured to swivel a full 360 degrees or less than 360 degrees. In implementations with either two or four wheels, at least two of the wheels, and in particular implementations, all four wheels, may be able to be locked to prevent movement of the caddy 2, especially when the caddy is to be used as a footstool.

Still referring to FIG. 4, the wheels 56 may extend beyond the base 8 of the body 4 and/or the first side of the body 4 and may be at least partially encapsulated by the body 4, however, in other implementations the wheels may be completely outside of the body. In various implementations, the wheels 56 may not extend below the base 8 of the body 4 when the caddy is situated flat on the ground. When the caddy is tilted, the wheels may then extend below the lowest point of the body and the caddy may be rolled. In such implementations, the caddy does not necessarily need feet to level out the caddy when it is to be used as a footstool.

Referring back to FIGS. 1-2, the caddy 2 includes a handle 62. In various implementations, the handle may have a fixed length and may not be configured to telescope or extend. In other implementations, as is illustrated by FIGS. 1-2 and 6, the handle may be configured to telescope which may allow for easier storage/mobility of the caddy when not in use. This may be particularly advantageous when the janitorial caddy is transported from various sites as it will be able to more easily fit in a truck, van, or even a car. As illustrated by FIGS. 1-2 and 6, the telescoping handle 62 may be coupled within the first side 16 of the body 4. In other implementations, the telescoping handle may be flush against either the outer surface or inner surface of the first side 16.

In implementations having a telescoping handle, the handle 62 includes a first portion 64 configured to be received by a second portion 66. The first portion 64 may include an opening 68 configured to allow a user to grasp the handle 62. In various implementations, the second portion 66 is extendable from the body 4. In such implementations, substantially half of the second portion 66 may remain in the body 4 (and in the first side 16 in implementations where the handle 62 is coupled within the first side 16) when the extendable handle 62 is in a fully extended configuration. In other implementations, more than half of the second portion 66 may remain in the body 4 (and in the first side 16 in implementations where the handle 62 is coupled within the first side 16) when the extendable handle 62 is in a fully extended configuration. In still other implementations, substantially a fourth or more of the second portion 66 may remain in the body 4 (and in the first side 16 in implementations where the handle 62 is coupled within the first side 16) when the extendable handle 62 is in a fully extended configuration. In implementations where a portion of the second portion 66 remains in the body when the handle is fully extended, the strength of the handle 62 may be increased.

As illustrated by FIGS. 1-2 and 6, the handle is substantially solid along a width of the handle perpendicular to the longest length of the handle. In various implementations, and as illustrated, a width of the second portion 66 perpendicular to a longest length of the extendable handle 62 is greater than any width of the first portion 64 perpendicular to the longest length of the extendable handle. Implementations having the substantially solid handle having a width at least as wide as the portion of the handle grasped by a user may add to the strength of the structure of the handle.

In various implementations, and as illustrated by at least FIGS. 5-6, the first portion 64 of the telescoping handle 62 may include a first channel 72 extending along a longest length of the first portion. In various implementations, the second portion 66 may include a second channel 70 extending along a longest length of the second portion 66. As illustrated, the second channel 70 corresponds to the first channel 72 inasmuch as the second channel is configured to fit within the first channel. In various implementations, the first side 16 may also include a channel 44, which may be considered the third channel, corresponding to the second channel and the first channel inasmuch as the third channel is configured to be received by the second channel and the first channel when the telescoping handle 62 is in a collapsed configuration. In such implementations, and as illustrated, a width of the first channel 72 is greater than a width of the second channel 70 and the width of the second channel is greater than a width of the third channel 44. In other implementations, the width of the third channel 44 may be greater than a width of the second channel 70 and the width of the second channel 70 may be greater than the width of the first channel 72. In implementations including channels within the portions of the handle 62, the channels may add to the strength of the structure of the handle. In still other implementations, the telescoping handle may include more than two portions configured to telescope with one another.

In various implementations, the handle may be configured to lock in place in either a collapsed or folded position and an extended position. As illustrated by FIGS. 5-6, in various implementations the lock 72 may include a latch fixed to the body 4 of the caddy and configured to insert within an opening in the extendable handle 62. In various implementations, the opening extends through the second portion 66 and partially through the first portion 64 of the handle 62. In other implementations, the opening extends entirely through the first portion 64 and the second portion 66.

In various implementations, and as illustrated by FIGS. 1-3 and 5-9, the telescoping handle and/or the first portion 64 may include a plurality of notches 74 formed therein at an end of the telescoping handle and/or first portion. In various implementations, the handle 62 may include one or more smaller openings 76 therethrough. In such implementations, a portion of a garbage bag, which may be a draw string of the garbage bag, may be inserted through one of the openings 76 and a draw string of the garbage bag may be received by the plurality of notches 74. In other implementations, the handle may include other mechanism(s) used to fasten a garbage bag to the handle, such as, by non-limiting example, hooks, clips, or any other mechanism. The handle may be ergonomic and may include a grip.

Referring back to FIGS. 1-2, the janitorial caddy 2 may include a first removable caddy 80 coupled over the first shelf 48 and/or a second removable caddy 82 coupled over the second shelf 50. In various implementations each removable caddy may include one or more dividers 84 forming a plurality of compartments 86. In particular implementations, the dividers may be removable, thus allowing a user to customize the size and number of the compartments. In such implementations, the inner sidewalls of the compartment may include notches or ridges therein configured to couple to a divider.

In various implementations, the caddy 2 may include a first clasp 88 configured to fasten a handle 92 of the first removable caddy 80 to the body 4 and/or a second clasp 90 configured to fasten a handle 94 of the second removable caddy 82 to the body 4. In such implementations, the first and/or second clasps may temporarily fix, alone or in combination with the recesses of the first shelf 48 and/or second shelf 50, the first removable caddy 80 and/or the second removable caddy 82 to the body 4 of the caddy 2.

In various implementations, and as illustrated by FIG. 1, the first removable caddy may include a sidewall 96 extending upwards from the compartments 86 to the handle 92. In such implementations, the sidewall 96, together with the remainder of the first removable caddy 80, may prevent items from within the interior of the body 4 from unintentionally departing the interior of the body. In such implementations, as illustrated by FIGS. 7-9, the first removable caddy may be configured to hold spray bottles and allow a user to carry the caddy by the handle while the spray bottles are within the first removable caddy. In various implementations, the second removable caddy 82 may include a similar sidewall.

In implementations having one or more removable caddies, the caddy 2 may be transferred from job site to job site, however, within a particular job site, rather than having to take the entire caddy 2 to wherever needs to be cleaned, a user may have the option of taking one of the removable caddies having the necessary supplies to clean a certain area or room of a job site.

In other implementations, the caddy 2 may not include removable caddies.

Referring to FIGS. 5-6, in various implementations the caddy may include a compartment 98 fixed to an outer surface of the first side 16 of the body 4. The compartment 98 may be open or may be closable. In various implementations, the compartment may include a slit 100 in a sidewall 102 thereof. In various implementations, the compartment may include one or more dividers 104 therein forming additional compartments. In such implementations, the additional compartments may also include slits 106 in the sidewall 102 of the compartment 98.

In various implementations, a serrated edge may be near the edge of any of the slits or part of the edge of any of the slits to allow for tearing and/or separating of the cleaning supplies and/or equipment, such as paper towels or garbage bags, or disposable gloves.

Referring to FIG. 8, the janitorial caddy may include a compartment 108 hanging from an upper portion 110 of the body 4. The compartment 108 may be configured to hang via flexible elements, such as cloth strips, straps, or rope, 112. The compartment 108 may be included within the interior of the body. In particular implementations, the compartment may be a cloth receptacle and may be configured to receive dirty or clean janitorial supplies.

In places where the description above refers to particular implementations of janitorial caddies and implementing components, sub-components, methods and sub-methods, it should be readily apparent that a number of modifications may be made without departing from the spirit thereof and that these implementations, implementing components, sub-components, methods and sub-methods may be applied to other janitorial caddies.

What is claimed is:

1. A janitorial caddy comprising:
    a body comprising a lid, a base opposing the lid, and a first side coupled between the lid and the base;
    two wheels coupled to the base;
    a telescoping handle coupled one of within the first side or flush against the first side;
    a first shelf extending from a second side of the body;
    a second shelf extending from a third side of the body, the third side opposite the second side;
    a first removable caddy coupled over the first shelf; and
    a second removable caddy coupled over the second shelf;
    wherein the lid is configured to move between an open configuration and a closed configuration;
    wherein one of the base or a plurality of feet coupled to the base are configured to contact a ground surface supporting the janitorial caddy when the base is substantially parallel to the ground surface;
    wherein at least one of the feet of the plurality of feet is closer to the first side of the body than a fourth side of the body opposite the first side of the body; and
    wherein the body is configured to be stood on by a person when the lid is in the closed configuration.

2. The janitorial caddy of claim 1, wherein the janitorial caddy is configured to be used as a step stool.

3. The janitorial caddy of claim 1, wherein the second side, third side, and a fourth side of the body opposite the first side are substantially open.

4. The janitorial caddy of claim 3, further comprising a crossbar extending across the fourth side.

5. The janitorial caddy of claim 1, wherein the first shelf comprises a first recess configured to receive the first removable caddy and the second shelf comprises a second recess configured to receive the second removable caddy.

6. The janitorial caddy of claim 1, wherein the first side comprises a first channel corresponding with a second channel within a length of the telescoping handle.

7. The janitorial caddy of claim 1, wherein an angle formed between the lid and the fourth side of the body is obtuse.

8. A janitorial caddy comprising:
a body comprising a lid, a base opposing the lid, and a first side coupled between the lid and the base;
two wheels coupled to the base;
a telescoping handle coupled one of within the first side or flush against the first side, the telescoping handle comprising a first portion and a second portion;
a first shelf extending from a second side of the body;
a second shelf extending from a third side of the body, the third side opposite the second side;
a first removable caddy coupled over the first shelf; and
a second removable caddy coupled over the second shelf;
wherein the janitorial caddy is configured to be used as a step stool;
wherein one of the base or a plurality of feet coupled to the base are configured to contact a ground surface supporting the janitorial caddy when the base is substantially parallel to the ground surface;
wherein the first portion of the telescoping handle is configured to be received by the second portion of the telescoping handle;
wherein the first portion of the telescoping handle comprises a first channel extending along a longest length of the first portion;
wherein the second portion comprises a second channel extending along a longest length of the second portion; and
wherein the first portion comprises a plurality of notches formed therein at an end of the first portion.

9. The janitorial caddy of claim 8, wherein one of substantially half or more than half of the second portion remains one of in the first side or flush against the first side when the telescoping handle is in a fully extended configuration.

10. The janitorial caddy of claim 8, wherein the first side comprises a third channel corresponding to the second channel and the first channel.

11. The janitorial caddy of claim 10, wherein a width of the first channel is greater than a width of the second channel and the width of the second channel is greater than a width of the third channel.

12. The janitorial caddy of claim 8, further comprising a first clasp configured to fasten a handle of the first removable caddy to the body and a second clasp configured to fasten a handle of the second removable caddy to the body.

13. A janitorial caddy comprising:
a body comprising a lid, a base opposing the lid, and a first side coupled between the lid and the base;
two wheels coupled to the base;
a telescoping handle coupled within the first side;
a compartment fixed to an outer surface of the first side of the body, the compartment comprising a slit in a sidewall thereof;
a first shelf extending from a second side of the body;
a second shelf extending from a third side of the body, the third side opposite the second side;
a first removable caddy coupled over the first shelf;
a second removable caddy coupled over the second shelf; and
a third shelf retractably coupled within the base of the body;
wherein one of the base or a plurality of feet coupled to the base are configured to contact a ground surface supporting the janitorial caddy when the base is substantially parallel to the ground surface;
wherein at least one of the feet of the plurality of feet is closer to the first side of the body than a fourth side of the body opposite the first side of the body; and
wherein the body is configured to be stood on by a person when the lid is in a closed configuration.

14. The janitorial caddy of claim 13, wherein the compartment fixed to the outer surface of the first side of the body comprises one or more dividers forming additional compartments, wherein the additional compartments each comprise an additional slit in a sidewall in each of the additional compartments.

15. The janitorial caddy of claim 13, further comprising a compartment hanging from an upper portion of the body, the compartment comprised within the body.

16. The janitorial caddy of claim 13, wherein an interior of the body is accessible through the second side, the third side, and a fourth side opposite the first side of the body.

17. The janitorial caddy of claim 13, further comprising a first clasp configured to fasten a handle of the first removable caddy to the body and a second clasp configured to fasten a handle of the second removable caddy to the body.

18. The janitorial caddy of claim 13, wherein the first shelf comprises a first recess configured to receive the first removable caddy and the second shelf comprises a second recess configured to receive the second removable caddy.

19. The janitorial caddy of claim 1, wherein an entire outer surface of the base is configured to contact the ground surface when the base is on and substantially parallel to the ground surface.

20. The janitorial caddy of claim 1, wherein the base is configured to extend lower than the two wheels when the base is on and substantially parallel to the ground surface.

* * * * *